A. T. GOLDFIELD.
VELOCIPEDE HORSE.
APPLICATION FILED MAR. 29, 1917. RENEWED APR. 18, 1918.
1,272,796.
Patented July 16, 1918.
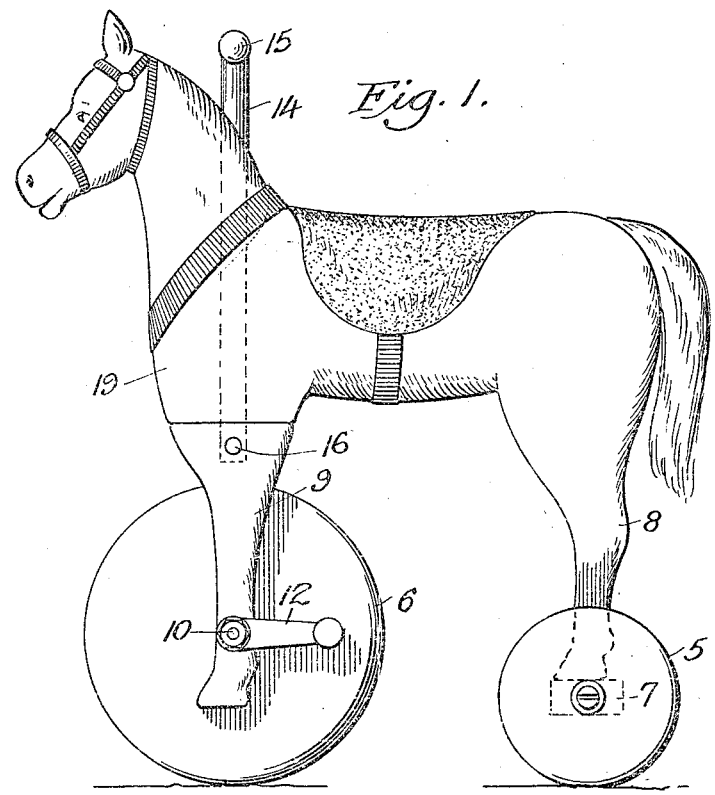
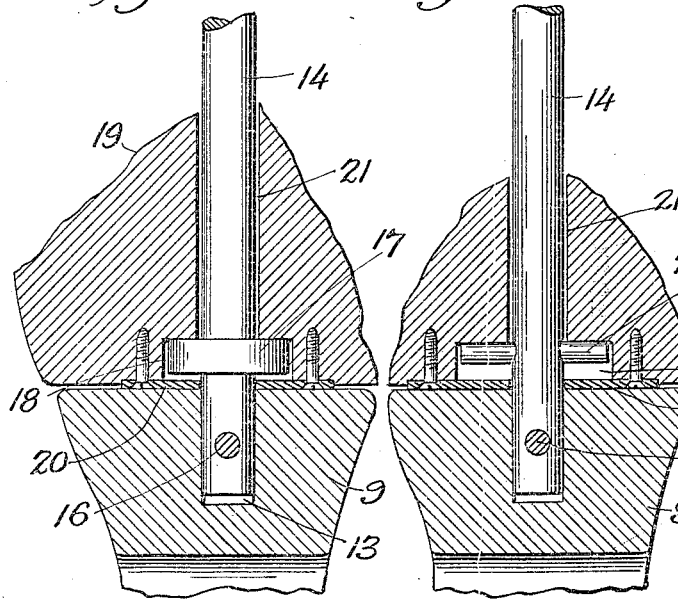
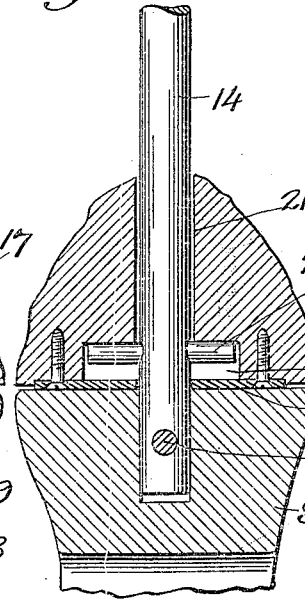
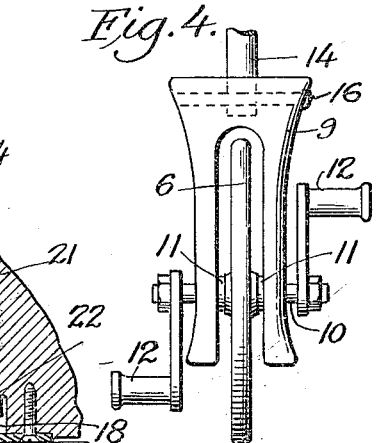
INVENTOR,
Abraham T. Goldfield,
BY
James F. Duhamel,
ATTORNEY

UNITED STATES PATENT OFFICE.

ABRAHAM T. GOLDFIELD, OF SPRING VALLEY, NEW YORK, ASSIGNOR TO SPRING VALLEY WOOD PRODUCTS CORPORATION, OF SPRING VALLEY, NEW YORK, A CORPORATION OF NEW YORK.

VELOCIPEDE-HORSE.

1,272,796.  Specification of Letters Patent.  Patented July 16, 1918.

Application filed March 29, 1917, Serial No. 158,160. Renewed April 18, 1918. Serial No. 229,418.

*To all whom it may concern:*

Be it known that I, ABRAHAM T. GOLDFIELD, a citizen of the United States, and resident of Spring Valley, in the county of Rockland and State of New York, have invented certain new and useful Improvements in Velocipede-Horses, of which the following is a specification.

This invention relates to toys and especially to velocipedes comprising the body of an animal, preferably a horse, on which the rider sits and having wheels at the lower ends of the legs, one wheel being provided with suitable pedals by which the rider may propel the device, as will be more fully described in the following specification, set forth in the claims and illustrated in the accompanying drawings, wherein:

Figure 1 is a side elevation of the velocipede horse.

Fig. 2 is a sectional detail view of the steering spindle.

Fig. 3 is a similar vew of a modified form of steering spindle.

Fig. 4 is a front view of the steering fork and wheel.

The invention is designed to provide a toy horse or other animal upon whose back a child may ride and which is mounted on wheels 5 at the rear and on a single steering wheel 6 at the front thereof. The wheels 5 are two in number and carried at the outer end of a bar 7 which supports the rear legs 8 of the animal while the single steering wheel 6 is journaled in a fork 9 comprising the front legs of the animal.

The fork 9 carries the shaft 10 of the steering wheel near its lower ends, suitable washers 11 being provided to space the wheel between the legs while pedals 12 are secured to the outer ends of the shaft. The upper end of the fork forms a substantial bearing surface for the front end of the animal's body and has a socket 13 into which is fitted the lower end of the steering spindle 14 passing through an opening 21 at the front of the said body and has at its upper end a cross bar 15 to act as a handle to direct the wheel 6.

The spindle 14 is secured in the socket 13 by means of a pin 16 passing through the upper end of the fork and a collar 17 is formed about the spindle to be located in a recess 18 in the lower side of the body 19 of the animal. A washer 20 is secured over the recess to retain the collar and act as a bearing for the upper end of the fork, its surface being eventually smoothed by continuous use and affording a ready means for changing the course of the toy. The washer at the same time confines the spindle to the opening 21 and prevents its dropping out while the pin 16 secures the fork in the proper place.

As will be seen in Fig. 3 a pin 22 may be substituted for the collar and answers the same purpose. It is obvious that the parts may be otherwise arranged or modified without departing from the essential features above described.

The device affords a ready means for amusing and is of few and substantial parts which are not liable to be broken or put out of order.

What I claim as new is:

1. In a velocipede horse, the combination with the body of a toy horse having an opening with a recess at its lower end, of a cross bar and wheels supporting the rear of the horse, front legs comprising a fork, a wheel in the fork, treadles for the latter wheel, a spindle having a steering cross bar and secured to the fork and playing in the opening, and retaining means for the spindle and located in the recess.

2. In a velocipede horse, the combination with the body thereof having a vertical opening and a recess at the lower end of the said opening, of rear legs supported on wheels, front legs comprising a fork, a wheel with treadles in the fork, a bearing plate for the fork and covering the recess, a spindle passing through the opening and secured to the fork, a cross bar at the upper end of the spindle, and a disk on the spindle located in the recess and retaining the spindle in the body.

Signed at New York city, in the county of New York and State of New York this 17th day of March A. D. 1917.

ABRAHAM T. GOLDFIELD.

Witnesses:
WM. J. MILLER,
EMILY O. WILLING.

Copies of this patent may be obtained for five cents each, by addressing the "Commissioner of Patents, Washington, D. C."